Sept. 21, 1965    D. COSTES    3,207,672
FIRE EXTINGUISHING SYSTEM FOR NUCLEAR REACTORS
Filed July 25, 1963
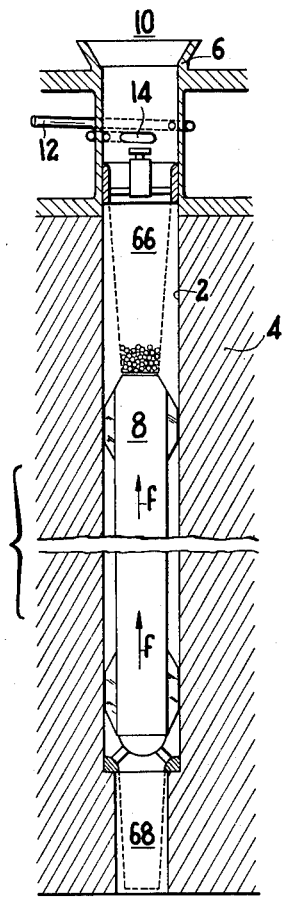
FIG.1
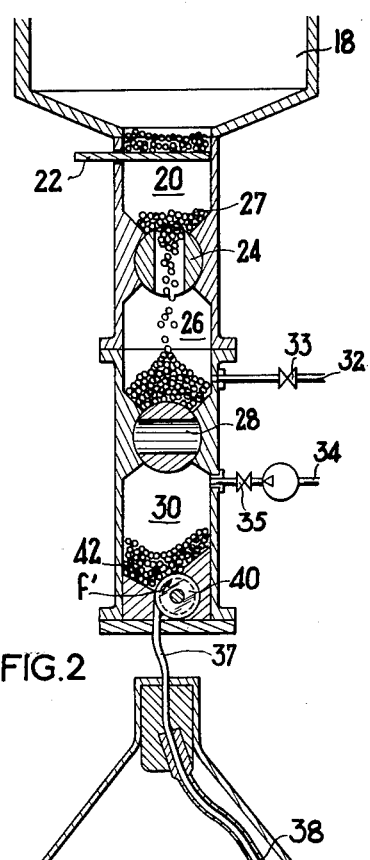
FIG.2
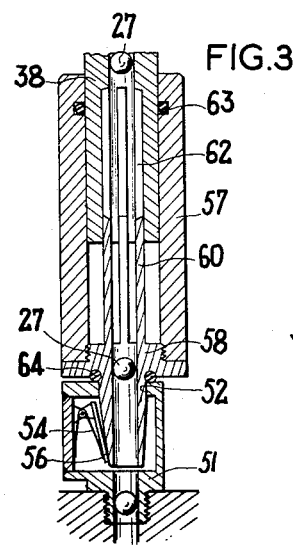
FIG.3
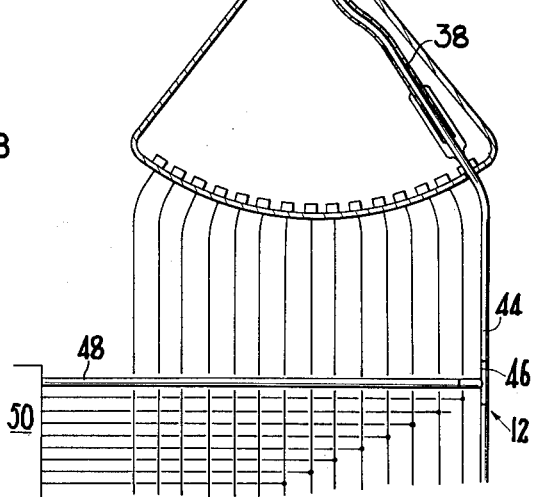

United States Patent Office 3,207,672
Patented Sept. 21, 1965

3,207,672
FIRE EXTINGUISHING SYSTEM FOR NUCLEAR REACTORS
Didier Costes, Paris, France, assignor to Commissariat à l'Energie Atomique, Paris, France
Filed July 25, 1963, Ser. No. 297,571
Claims priority, application France, Aug. 7, 1962, 906,390
7 Claims. (Cl. 176—38)

This invention relates to means for quickly damping or smothering highly exothermal chemical reactions in nuclear reactors, such means being of especial significance and value as emergency means for extinguishing a fire occurring in a vertical channel of a reactor.

Heterogeneous nuclear reactors are provided with channels extending through a body of moderator substance. The channels may be directly recessed out of the moderator, as is the case e.g. in graphite-moderated reactors, or may consist of conduits passed through a body of liquid moderator. The channels have nuclear fuel elements or cartridges inserted therein and streams of coolant gas are circulated through the channels to evacuate the heat generated by the nuclear reaction in the fuel. Should an excessive temperature rise occur in the fuel material or the cladding thereof, e.g. as a result of an accidental decrease in coolant flow rate, highly exothermal chemical reactions are apt to be initiated within the channels. As an example of such dangerous chemical reactions, it can be indicated that the light weight metal alloys from which the fuel cladding is often made and uranium metal are liable to react in an exothermal combustion-type chemical reaction with the carbon dioxide generally used as the coolant gas.

Such highly exothermal chemical reactions, are occasionally referred to herein as "burning," "combustion" or "fire" even though a direct oxidation process characterizing true combustion may not be involved therein.

The initiation of such chemical reactions can be detected by suitably monitoring the temperature of the fuel cartridges and/or the temperature of the gas issuing from the reactor channels, as well as by chemical and radioactive analysis of gas samples periodically withdrawn from each channel, as by means of the usual devices used for detecting fracture of the fuel cladding. On detection of such an event the reactor is immediately shut down through release of the control and emergency rods to arrest the neutron flux in the reactor core. Such a measure however is not in itself sufficient to stop any combustion that has commenced, and this may lead to very grave consequences, especially in reactors having vertical channels. The fire is liable to spread upward through the channel due to the natural draft and/or the induced coolant blast where this is circulated in an upward direction; it can also spread downward due to the fall of burning debris. The entire channel is apt to catch fire and cause considerable contamination in all of the reactor loops.

One useful precautionary measure in this respect may lie in strongly reducing the circulation rate of coolant so as to avoid renewing the coolant in contact with the combustion area. The blast cannot be completely cut off however since shutting down the neutron flux in the reactor core does not lead to an immediate stop in the release of heat in all the channels, and some cooling remains necessary to prevent excessive heating of the core.

Objects of this invention include the provision of means which will prevent a fire, or similar chemical reaction that may have occurred at one point of a reactor channel, from spreading to the channel as a whole, and to damp out or smother such fire through an action that will be restricted to the channel involved and without affecting the circulation of coolant gas through the remaining channels of the reactor. Other objects of the invention will appear as the disclosure proceeds.

According to an aspect of the invention, there are provided means for releasing divided, non-combustible material into an upper section of the channel in which a combustion reaction has commenced, and for retaining said material within the channel in order to obstruct the flow of coolant gas therethrough, cool the hot areas of the combustion zone, and damp the combustion reaction.

The apparatus used according to the invention may comprise a magazine containing a store of divided non-combustible material, preferably supported at a level above the upper ends of the channels, a network of flow passages whereby said magazine may be communicated with any selected one of the reactor channels, and retainer means associated with each channel and actuable to permit the flow of divided material from the store into the channel and including means in the channels for preventing the escape of the material therefrom.

The objects, patentable features and advantages of the invention will become clearly apparent from the ensuing description of an exemplary embodiment of the invention illustrated in the accompanying drawings, wherein:

FIG. 1 is a schematic sectional view of the upper and lower sections of a reactor channel;

FIG. 2 is a similar view of the channel selector means and the means for feeding the divided material from the store to the selected channel;

FIG. 3 is a detail view in longitudinal section showing a connecting device used in the selector means of FIG. 2.

Shown in FIG. 1 are the upper and lower parts of a vertical channel 2 of a reactor using solid moderator material, e.g. graphite, of generally conventional character, and employing an upward circulation of coolant gas. The channel is formed through a stack of moderator bars 4 and has connected to its upper end an extension tube or centering head 6 opening into a gas outlet manifold 10. The channel contains a series of fuel elements or cartridges such as 8. Connected to the extension tube 6 is a tube or conduit 12 leading to a conventional monitoring device for detecting cladding rupture. The conduit 12 preferably is open to the extension tube 6 at a plurality of points in order to ensure distributive sampling. A similar result can be obtained by causing the conduit 12 to spiral around the tube 6 and open into the channel through an elongated port 14, with the conduit 12 then being substantially tangential to the tube. This latter arrangement is used herein for reason to appear later.

The reactor channel construction so far described is more or less conventional, except that for reasons that will later appear the conduit 12 is made to deliver into the extension tube 6 tangentially and with a slight downward slope, as shown.

Comparatively cool gaseous coolant from the usual heat exchangers is admitted by way of a lower inlet manifold (not shown) into the lower end of the channel 2, rises upward through the channel in which it is heated by contact with the fuel cartridges 8 therein and flows out into outlet manifold 10, as indicated by the arrows $f$ in FIG. 1.

A perforate or foraminous container or basket 68 is positioned in the bottom of channel 2.

Emergency apparatus according to the invention will now be described with especial reference to FIG. 2. The apparatus comprises a magazine 18 open to the atmosphere and containing a store of non-combustible material in a divided state. By this latter phrase it is meant herein that the material is in the form of solid particles, such as grains, granules, balls, beads, shot or spherules, capable of flowing or sliding with respect to one another and of filling a capacity as would a fluid, within the limits normally permitted by the presence of unavoidable friction and jamming between the solid particles. The material should be selected with a specific gravity such as to be capable of falling under its own weight, and in the case of an upward circulation of coolant gas as here described steel shot of a few millimeters diameter may satisfactorily be used, so as to drop by gravity even in the presence of the full normal upward flow of the coolant.

The bottom outlet of tank 18 is fitted with a valve 22 herein schematically shown as a sliding gate valve, separating the tank 18 from a feed hopper 20. Valve 22 does not have to provide a gas-tight seal.

Feed hopper 20 is provided at its bottom outlet with a gas-tight valve device 24 which constitutes the inlet valve to a lock chamber 26. The lock chamber 26 is provided with an outlet valve 28 similar to valve 24. While the inlet and outlet valves 24 and 28 are here shown as rotary valve members this is not essential and other suitable types may be used. The lock chamber 26 and hopper 20 may be dimensioned to have a volume sufficient to contain a body of shot 27 that will fill the channel 2 say in ten deliveries. The outlet lock outlet valve 28 overlies a lower injection hopper 30.

A conduit 32 having a cut-off valve 33 therein connects lock chamber 26 with a source of coolant gas at a pressure equal to or somewhat higher than the pressure obtaining in the reactor pressure vessel. Conduit 32 serves to equalize the pressures in the lock chamber and reactor after the inlet valve 24 has been opened and before opening outlet valve 28.

Injector hopper 30 is further provided with a conduit 34 including a cut-off valve 35 therein and connected to a source of coolant gas at a pressure substantially higher than that in the reactor. Opening valve 35 will apply into the injection hopper 30 an over-pressure facilitating the flow of the steel shot down into the feed passage system now to be described.

The bottom outlet of injection hopper 30 is connected through feed member 40 presently described with the upper end of a tube 37 adapted to be connected to any selected one of the reactor channels in a substantially gas-tight manner. The selector device used may assume any of various conventional types and need not be described herein in detail. A full description of one type of selector system satisfactory for the purposes of the present invention may be found in French Patent 1,157,964 of the Commissariat à l'Energie Atomique, and the second addition n° 71.809 to that patent.

Thus, feed tube 37 is shown as being extended by a director tube 38 movable within a sealed enclosure to any one of a number of positions in which tube 38 makes connection with any one of a number of tubes 44 which are connected to the rupture-detecting or monitoring means associated with the respective channels. Preferably, tubes 37 and 38 are only slightly larger in diameter than the maximum diameter of the shot 27 contained in tank 18, so as to avoid the danger of jamming, and also to facilitate a rapid circulation of a single-file string of steel balls through the tubes under the pressure of the gas delivered through conduit 34.

To facilitate initiation of the flow of shot from hopper 30 into tube 37 there is provided a feeder member 40 in the form of a grooved pulley positioned in the hopper outlet and rotatable in the direction indicated by arrow f'. The pulley groove cooperates with a deflector wall 42 to provide a funnel and its rotation at a suitable rate acts continually to lift the corresponding funnel wall thereby preventing the shot from jamming and ensures a smooth downward flow of the shot in a single-line array.

Each of the tubes such as 44 is connected to the related rupture-detecting pipe 12 by way of a T-connector 46 so arranged that the path of the shot is continued straight through into pipe 12 while the take-off pipe 48 leading to the rupture-detecting unit 50 is at a sharp angle to said path thereby preventing misdirection of the shot. Moreover, the pipe 12 at least at its point of connection with the T-connector has a diameter smaller than that of the shot.

The selective connection between movable selector tube 38 and the selected one of tubes 44 should be effected in a substantially gas-tight manner. In addition each of the tubes 44 when not connected to selector tube 38 should be tightly sealed at its upper end. One example of the selective connecting means between tubes 38 and 44 for achieving these results is schematically shown in FIG. 3.

FIG. 3 shows the upper end part of a tube 44, which is in the form of a valve housing 51 having an upper opening 52. A valve member 56 pivoted to a side of the casing 51 is actuated by a leaf spring 54 which urges the valve member 56 to rotate (counterclockwise) so as to seal the opening 52. The selector tube 38 has a sleeve 57 slidable around it and in tight sealing engagement with the smooth outer peripheral surface of the lower end of the selector tube, and projecting downwardly beyond its lower end. The sleeve 57 may desirably be assembled from several parts and includes a frustoconical nozzle part 58 projecting from its lower end and engageable through the opening 52 into the valve casing 51. Longitudinal splines 60 supported from the sleeve 57 and slidable in internal grooves 62 of tube 38 serve to guide the steel balls 27 therein. A seal ring 63 seated in a groove in the inner surface of the sleeve provides a tight seal during the latter's sliding displacements. A further seal ring 64 seated in the under surface of the sleeve around the nozzle tightly engages the upper surface of the valve casing 51 in the inserted condition of the nozzle. On insertion of the nozzle into the valve casing 51, the nozzle forces the valve 56 to its open position (as shown in FIG. 3), in which the shot 27 can freely pass from tube 38 into tube 44.

*Operation*

To condition the apparatus for operation, an amount of shot 27 sufficient for one fire-extinguishing operation in a channel of the reactor is transferred from tank 18 into the lower or injector hopper 30. This transfer is effected by way of the lock chamber 26 through suitable actuation of the lock valves 24 and 28 as will be evident from the description earlier given.

If it is desired to test the apparatus of the invention, with the reactor charged with fuel and pressurized, a receiver basket 66 (FIG. 1) is advantageously inserted in the upper section of a channel of the reactor in which the test is to be carried out, below the connection of tube 12. After the shot has been fed to the selected channel, the basket 66 with the shot received therein can then easily be removed from the tested channel through conventional handling means. In the actual operation of the reactor, the basket 66 is of course removed. If necessary, a dummy fuel cartridge may be inserted instead.

On detection of a fire (or abnormal chemical reaction) in a reactor channel, the neutron discharge in the reactor core is at once shut down, and the coolant gas circulation rate is, preferably, somewhat reduced. Selector tube 38, is connected up with the particular tube 44 relating to the channel that is on fire. For this purpose suitable means not shown, such as an electromagnet, raises the sleeve 57 upwards from the position shown in FIG. 3, and means not shown, e.g. similar to the means described in the afore-mentioned French addition patent, moves the selector tube 38 into alignment with the requisite tube 44. The sleeve 57 is then released to its lower position so that its nozzle enters the valve casing 51 forcing valve 56 to its open position. In this position, as shown in FIG. 3, a free path is provided for the shot from tube 38 to tube 44, and a sealed connection is present between the tubes. The connection thus being set up, the feeder wheel 40 is set into rotation by means of a suitable motor not shown, and valve 35 is opened to supply pressure into hopper 30. The shots are then driven at a high rate from the hopper down through the tubes 37, 38, 44 and 12 into the burning channel. Since the tube 12 opens tangentially into the channel at a slight downward angle, the balls described helical paths around the inner surface of the channel whereby their kinetic energy is gradually taken up and rebound of the shot against the channel walls as well as their projection upwards into manifold 6 are prevented.

The introduction of the steel shot into the channel causes the following effects, in succession:

The initial quantities of shot introduced tend to be blown about at random by the rising stream of coolant gas (assuming the flow rate of coolant through the reactor core has been maintained at an appreciable value) but after enough shot has been delivered into the channel the weight of the shot soon overcomes the upward gas pressure and the shot is collected as an immovable mass within the lower receiver basket 68 at the bottom of the channel. This greatly retards the upward flow of gas and hence prevents the renewal of the gas to sustain combustion or other chemical reaction in the danger zone. In many cases this is found sufficient to check the combustion. The heat released by the fuel in the reactor due to its residual radioactivity and by the combustion reaction being damped is dissipated mainly through conduction and radiation and taken in by the side walls of the channel. Moreover, this initial charge of shot may have a highly beneficial action due to its direct impact on to the combustion zone.

If the introduction of shot is continued, the height of the charge of shot in the channel rises until it reaches the combustion zone. The mass of shot then acts to arrest the convection flow of the gases around the fins usually provided on the fuel cartridges 8, cools the contents of the channel due to its high thermal inertia, and improves heat exchange by conduction through the mass of shot from the fuel cartridges to the sides of the channel.

The above effects all contribute to damp out and extinguish the combustion reaction. Moreover, the mass of shot acts to trap dangerous debris within a small area and prevents their dispersal, facilitating subsequent decontamination. In addition, the shot may be made from a material having a large neutron capture cross section in which case neutron absorption by the shot contributes to a rapid cooling-off of the reactor, especially in cases where the latter requires the introduction of static neutron absorbers after operation of the normal shutdown means.

After the depth of shot in the channel has reached a sufficient level the general circulation of coolant at normal rate can be resumed in order to cool down the core as a whole. The shot is retained within the channel due to its large specific gravity and the fission products are retained in the mass of shot. It may be advantageous to oxidize somewhat the surface of the shot to facilitate the bonding of the fission products thereon.

After the fire has been put out and the reactor shut down and cooled, the channel can be emptied by any suitable means. An electromagnet may be used if the shot used is of a suitably magnetic material. Another convenient procedure that is broadly applicable is to insert into the channel a suction pipe connected to a suitable suction source. Means are provided for imparting vertical reciprocation to the suction pipe to break up any accumulations of shot and/or debris. After the mass of shot surrounding one fuel cartridge has been cleared in this way, the cartridge is withdrawn with suitable gripper means, the shot-clearing process is resumed, and so on repeatedly.

It will be apparent that various changes and modifications may be introduced into the single embodiment of the invention illustrated and described without exceeding the scope of the invention as claimed.

What is claimed is:

1. Apparatus for extinguishing a fire in any one of a plurality of vertical fuel channels of a gas cooled nuclear reactor, comprising a magazine for storing non-combustible material in divided form and positioned at a level above that of the upper ends of said channels, connecting line means selectively operable for connecting said magazine to the upper end of a selected channel, said connecting line means including valve means normally preventing the downflow of said material from the magazine to the selected channel, means for actuating said valve means to open condition on selective connection with a channel, and means in each channel for retaining therein the material fed thereinto.

2. Apparatus for damping a chemical reaction in any one of a plurality of nuclear reactor fuel channels comprising a magazine for storing non-reagent material of relatively high specific gravity in divided form, a feed tube extending from one end of each reactor channel, selective connecting means comprising a selector tube having one end connected with said magazine and another end selectively connectable with the free end of a selected one of said feed tubes, valve means for feeding a charge of said material from the magazine through said selective connecting means into said one end of a selected channel, and retaining means positioned adjacent the opposite end of each channel for retaining therein a charge of said material fed thereinto.

3. The apparatus claimed in claim 2, wherein said channels are vertical and said one end of the channel is the upper end thereof.

4. The apparatus claimed in claim 2, wherein said feed tubes comprise portions of lead-off tubes provided in said reactor for leading off samples of coolant gas to monitoring means.

5. The apparatus claimed in claim 2, wherein said feed tubes connect substantially tangentially with said channels.

6. The apparatus claimed in claim 2, including serially interposed between the magazine and connecting line means a pressure lock device, a pressurizable feed chamber having an outlet connected with said selector tube, and feeder means operable for feeding the material through the outlet.

7. The apparatus claimed in claim 2 including valve means positioned in the free end of each of said feed tubes and normally biased to a closing position, and means actuating said valve means to open position on connection of the selector tube with a selected one of said feed tubes.

References Cited by the Examiner

UNITED STATES PATENTS 3,025,226  3/62  Martin et al. _____ 176—32

FOREIGN PATENTS 656,791  1/63  Canada.
1,259,603  3/61  France.
869,560  5/61  Great Britain.
905,684  9/62  Great Britain.

REUBEN EPSTEIN, *Primary Examiner.*

L. DEWAYNE RUTLEDGE, *Examiner.*